(12) United States Patent
Williams et al.

(10) Patent No.: US 10,768,696 B2
(45) Date of Patent: Sep. 8, 2020

(54) EYE GAZE CORRECTION USING PURSUIT VECTOR

(71) Applicant: Microsoft Technology Licensing, LLC, Redmond, WA (US)

(72) Inventors: Shane Williams, Seattle, WA (US); Andrew D. Wilson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/726,282

(22) Filed: Oct. 5, 2017

(65) Prior Publication Data

US 2019/0107884 A1 Apr. 11, 2019

(51) Int. Cl.
G06F 3/01 (2006.01)
G06F 3/0481 (2013.01)
G06F 3/0484 (2013.01)
G06T 13/80 (2011.01)

(52) U.S. Cl.
CPC ............ G06F 3/013 (2013.01); G06F 3/0481 (2013.01); *G06F 3/04842* (2013.01); *G06F 2203/04806* (2013.01); *G06T 13/80* (2013.01)

(58) Field of Classification Search
None
See application file for complete search history.

(56) References Cited

U.S. PATENT DOCUMENTS

| | | | |
|---|---|---|---|
| 6,152,563 A | 11/2000 | Hutchinson et al. | |
| 6,243,076 B1 | 6/2001 | Hatfield | |
| 6,659,611 B2 | 12/2003 | Amir et al. | |
| 7,682,026 B2 | 3/2010 | Huffman et al. | |
| 8,885,882 B1 | 11/2014 | Reale et al. | |
| 9,208,598 B2 | 12/2015 | Shuster et al. | |
| 9,237,844 B2 | 1/2016 | De Bruijn et al. | |
| 2011/0141011 A1 | 6/2011 | Lashina et al. | |
| 2011/0254865 A1* | 10/2011 | Yee | G06F 3/013 345/661 |
| 2013/0050432 A1 | 2/2013 | Perez et al. | |

(Continued)

FOREIGN PATENT DOCUMENTS

| | | |
|---|---|---|
| EP | 2808762 A1 | 12/2014 |
| WO | 2014192001 A2 | 12/2014 |
| WO | 2016140628 A1 | 9/2016 |

OTHER PUBLICATIONS

"International Search Report & Written Opinion Issued in PCT Application No. PCT/US2018/052514", dated Dec. 21, 2018, 13 Pages.

*Primary Examiner* — Amare Mengistu
*Assistant Examiner* — Sarvesh J Nadkarni (57) ABSTRACT

Representative embodiments disclose mechanisms for calibrating an eye gaze selection system. When the calibration is triggered, a snapshot of an area around the current user's gaze point is taken. The snapshot area is then animated to cause motion of the snapshot area. As the snapshot is animated, the user's gaze will naturally track the thing the user was focusing on. This creates an eye tracking vector with a magnitude and direction. The magnitude and direction of the eye tracking vector can then be used to calculate a correction factor for the current user's gaze point. Calibration can be triggered manually by the user or based on some criteria such as error rates in item selection by the user.

20 Claims, 10 Drawing Sheets

(56) References Cited

U.S. PATENT DOCUMENTS

| | | | |
|---|---|---|---|
| 2014/0226131 A1* | 8/2014 | Lopez | G06F 1/1626 351/210 |
| 2014/0334666 A1 | 11/2014 | Lankford et al. | |
| 2016/0139665 A1 | 5/2016 | Lopez et al. | |
| 2017/0108924 A1 | 4/2017 | Hurter | |

* cited by examiner

EYE GAZE CORRECTION USING PURSUIT VECTOR

FIELD

This application relates generally to eye gaze tracking. More specifically, this application relates to correcting location errors in an eye gaze system.

BACKGROUND

The advent of relatively low-cost eye gaze tracking subsystems have increased the utilization of eye gaze tracking in user interfaces as a replacement for mouse, keyboard, gesture and other types of input. Gaze dwell (i.e., tracking when a user is focusing on an item) is the technique mostly used to trigger events such as button clicking. However, the eye gaze signal tends to be noisy and imprecise. Thus, item selection in a user interface using eye gaze tracking tends to be quite error prone and the system can easily misinterpret the user's intent. Additionally, the user can inadvertently trigger a selection, button click, and so forth. Thus, eye gaze tracking has yet to find wide acceptance.

It is within this context that the present embodiments arise.

DETAILED DESCRIPTION

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

An eye gaze subsystem produces a signal showing a measurement of where a user is looking and thus can be used to identify the location a user is looking at on a display. As mentioned in the background, the eye gaze signal is noisy and imprecise. Eye gaze subsystems can include a calibration procedure that is run upon system startup to improve tracking accuracy. However, these calibration procedures require specific content on the screen.

The disclosed embodiments do not need a separate calibration process that is invoked upon startup. The calibration embodiments described herein require no knowledge of what is on the screen. Thus, calibration can be invoked at any time and requires only a few seconds. Embodiments disclose different ways of triggering calibration such as user triggered, monitoring error rates, and other indicators of poor calibration.

Calibration is performed by taking a snapshot of an area around the reported user gaze location. A selected animation is invoked for the snapshot area which causes a pursuit vector to be identified by the eye tracking subsystem. A correction factor is calculated from the pursuit vector and applied at that location of the screen.

DESCRIPTION

Figure 1:
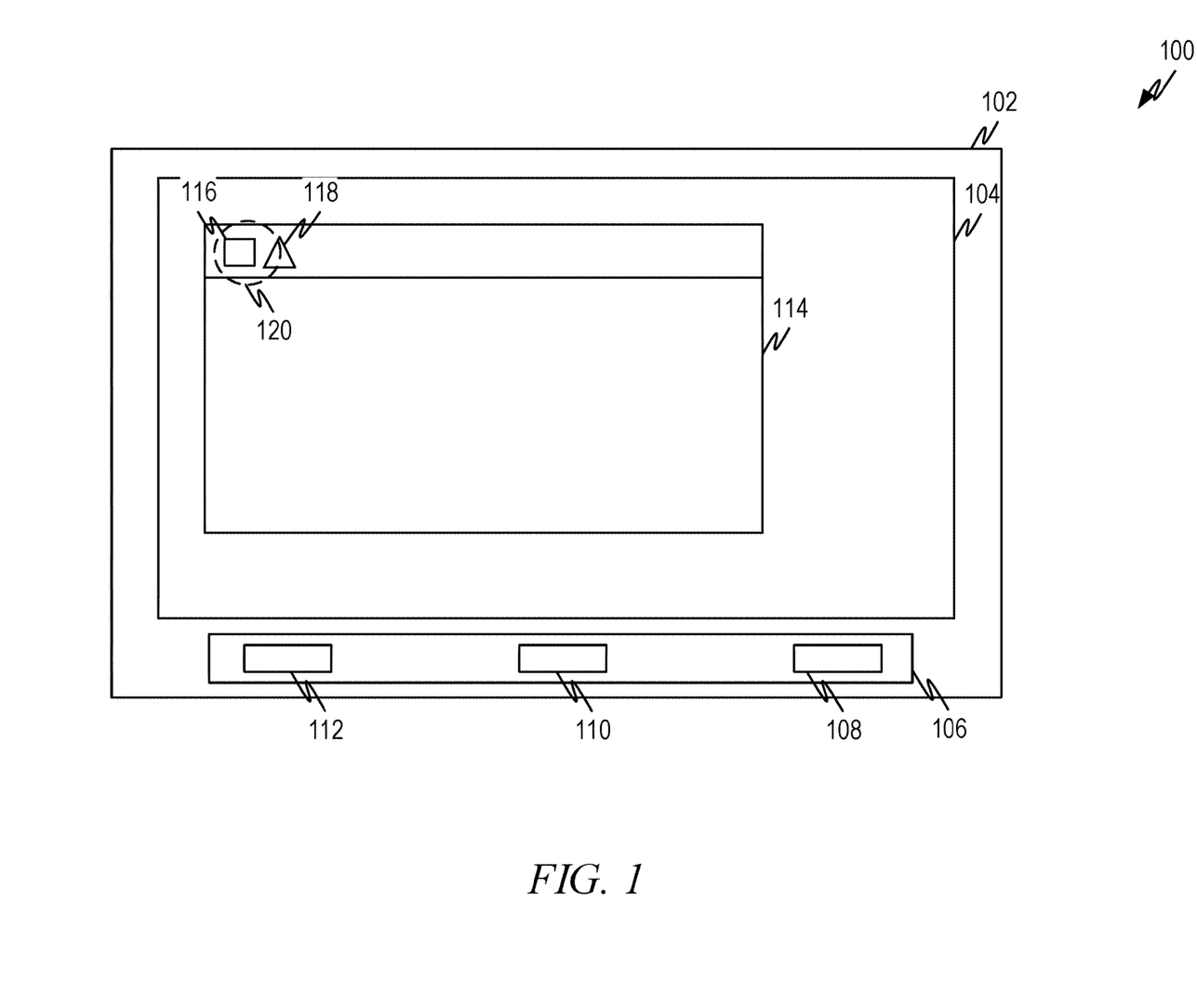
FIG. 1 illustrates an example display with eye gaze tracking.

FIG. 1 illustrates an example display system 100 with eye gaze tracking. A display system 100 comprises a display 102 with a screen area 104. The screen area 104 is used to present information as described herein to facilitate eye gaze selection of items, such as user interface elements. The system can be used to select anything that can be displayed on a screen such as text, graphics, icons, symbols, and other screen elements. In this disclosure, the representative example of icons or text will be used, but any items can be used with the embodiments disclosed herein.

In the simple example of FIG. 1, the screen area 104 comprises a window 114 such as might be used to display information associated with an operating system, a program, an app, or other such executable items. The window comprises elements 116 and 118 that are displayed on the screen area 104.

The system 100 includes an eye tracking subsystem 106. Such a subsystem 106 typically comprises one or more light sources and one or more cameras. These elements are identified by 108, 110, and 112. A typical arrangement might have two or more infrared light sources and an infrared camera, although different eye tracking subsystems can comprise any number of light sources, cameras and so forth.

Figure 2:
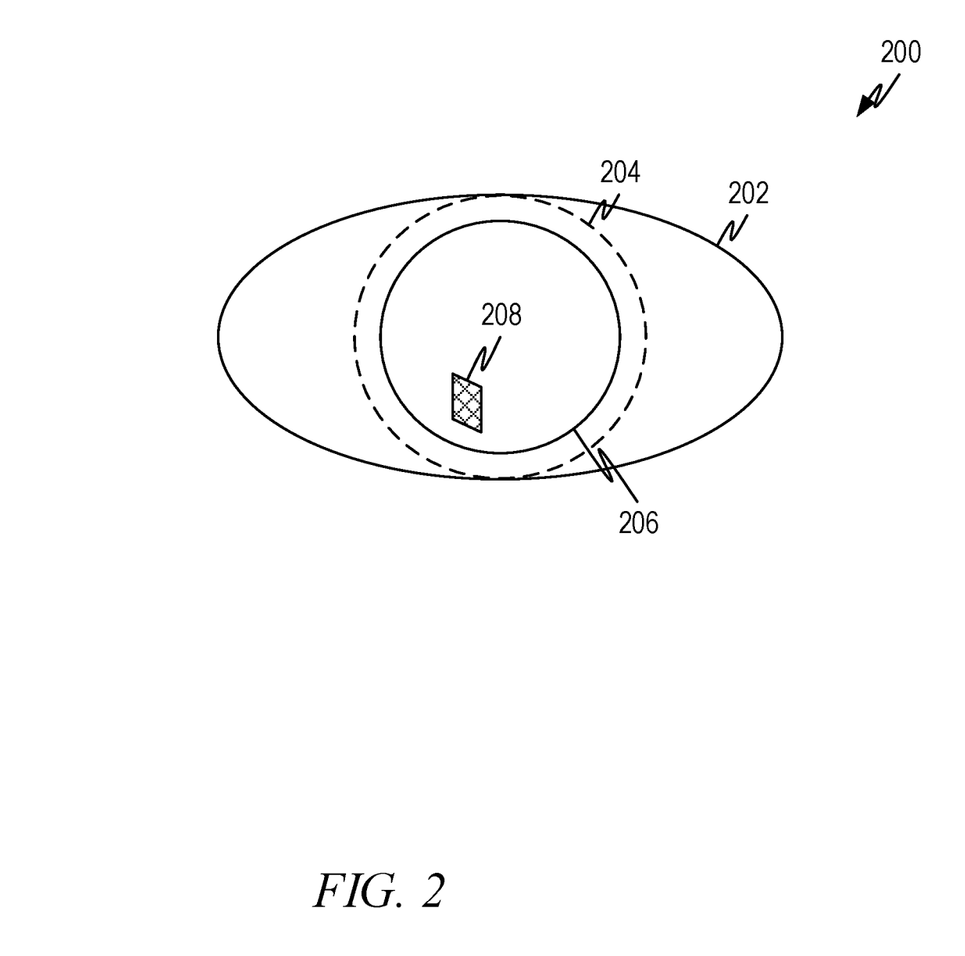
FIG. 2 illustrates a representation of an eye, eye glint which can be used by an eye gaze tracking subsystem to identify where a user is looking.

The light sources are typically used to emit light in such a way that a glint and/or pupil of a user's eye can be detected as illustrated in FIG. 2. Turning for a moment to FIG. 2, this figure contains a representation of an eye, eye glint which can be used by an eye gaze tracking subsystem to identify where a user is looking.

As shown in FIG. 2, an eye image 202 has iris 204 and pupil 206. In infrared light, the pupil is often seen as a bright reflection. In addition, the illumination causes glint 208 (as well as optional additional Purkinje reflections). Images of one or both eyes are captured and the patterns of glint, reflections, and/or the pupil are evaluated to identify where the user is looking. After calibration, the system can produce a signal that identifies where on a screen the user is looking.

Returning now to FIG. 1, the user focus (e.g., where the user is looking) is illustrated by dashed circle 120. The location where the user is looking can be correlated to what is being displayed at that location and an item on the screen identified where a user is looking. The eye gaze subsystem produces a signal that identifies where the user is looking. This can be evaluated over time to identify whether a user is staring at a particular element for a period of time (e.g., dwell time). This dwell time can be used to identify selection of an initial or primary selection target as described below.

In addition, the eye gaze signal over time can be used to create a movement vector having an origin (starting location), magnitude (distance), and direction (angular direction). This can be used to calculate a correction factor for a gaze point as discussed below.

Figure 3:
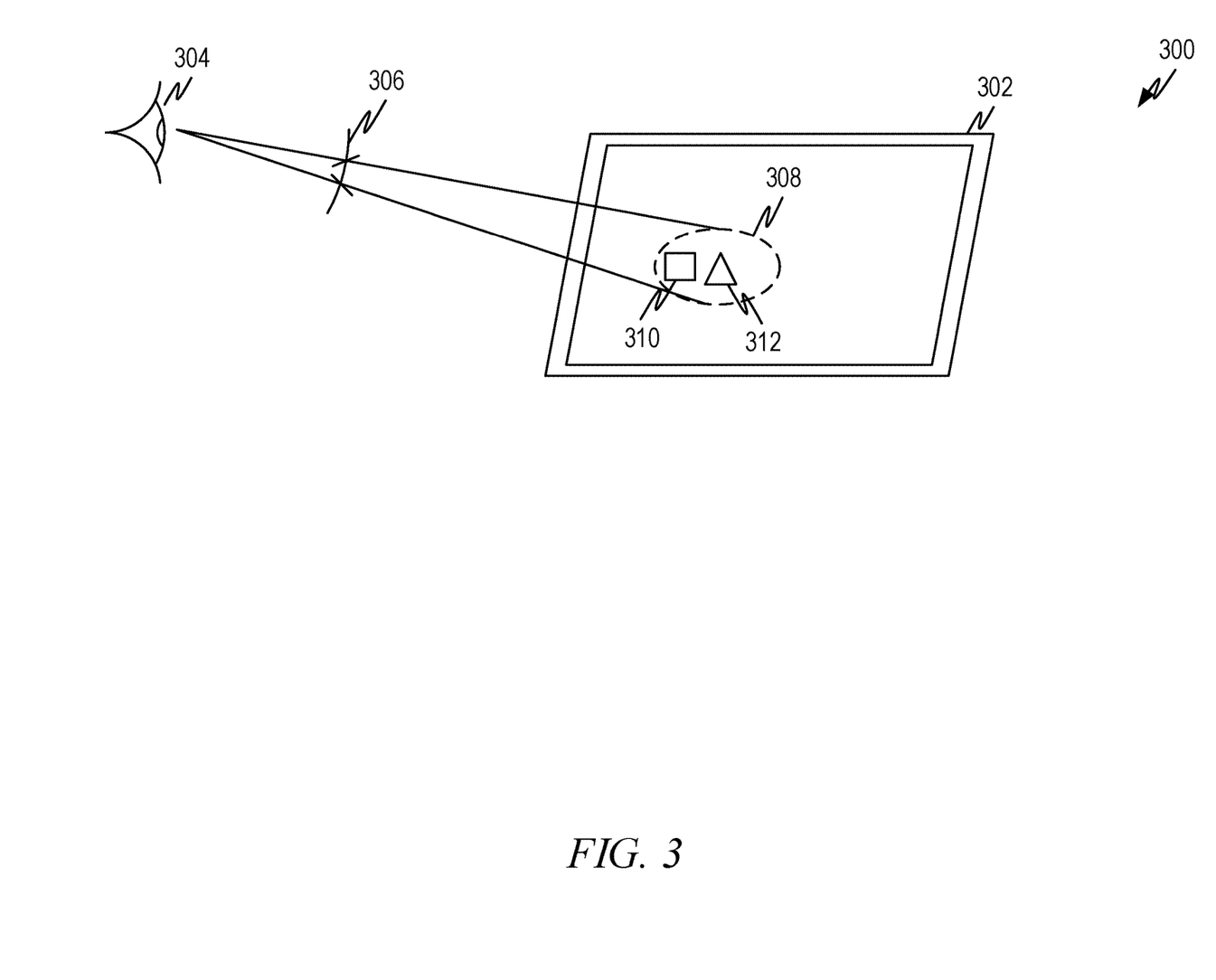
FIG. 3 illustrates example displays and the impact of angular error on item selection.

FIG. 3 illustrates example displays 300 and the impact of angular error on item selection. This illustrates the problem of the noisy eye gaze signal. For commercial grade eye gaze subsystems, the eye gaze signal can have a typical angular error of between 0.3 and 0.6 degrees in a well calibrated system and greater where the calibration is off in some fashion. Thus, from a user's eye 304, the angular error 306 resolves itself into an error area 308 on the screen. Assuming, for simplicity, that the error area 308 is circular (e.g., the user is looking perpendicular to the screen 302), this means that for a typical distance of a user's eye to a monitor between 24 and 30 inches away, the circular error area 308 is between about 0.13 inches and 0.31 inches. In other words, the actual location where the user is looking and the reported location where the user is looking can be off by at least that much in a well calibrated system. As discussed below, without calibration, the difference between actual and reported locations can be off much more.

Even with calibration, the error area 308 sets a limit on how close displayed elements 310, 312 (screen elements) can be if the system is to differentiate between them. Thus, if displayed screen elements are optimized for gaze dwell detection (i.e., selection by staring at a screen element for some period of time), there is a limit on how close the elements can be placed together and still have reasonable detection probability. Without good calibration, error rates in user item selection climb to unacceptable limits. The embodiments below describe how calibration to reduce eye gaze error.

Figure 4:
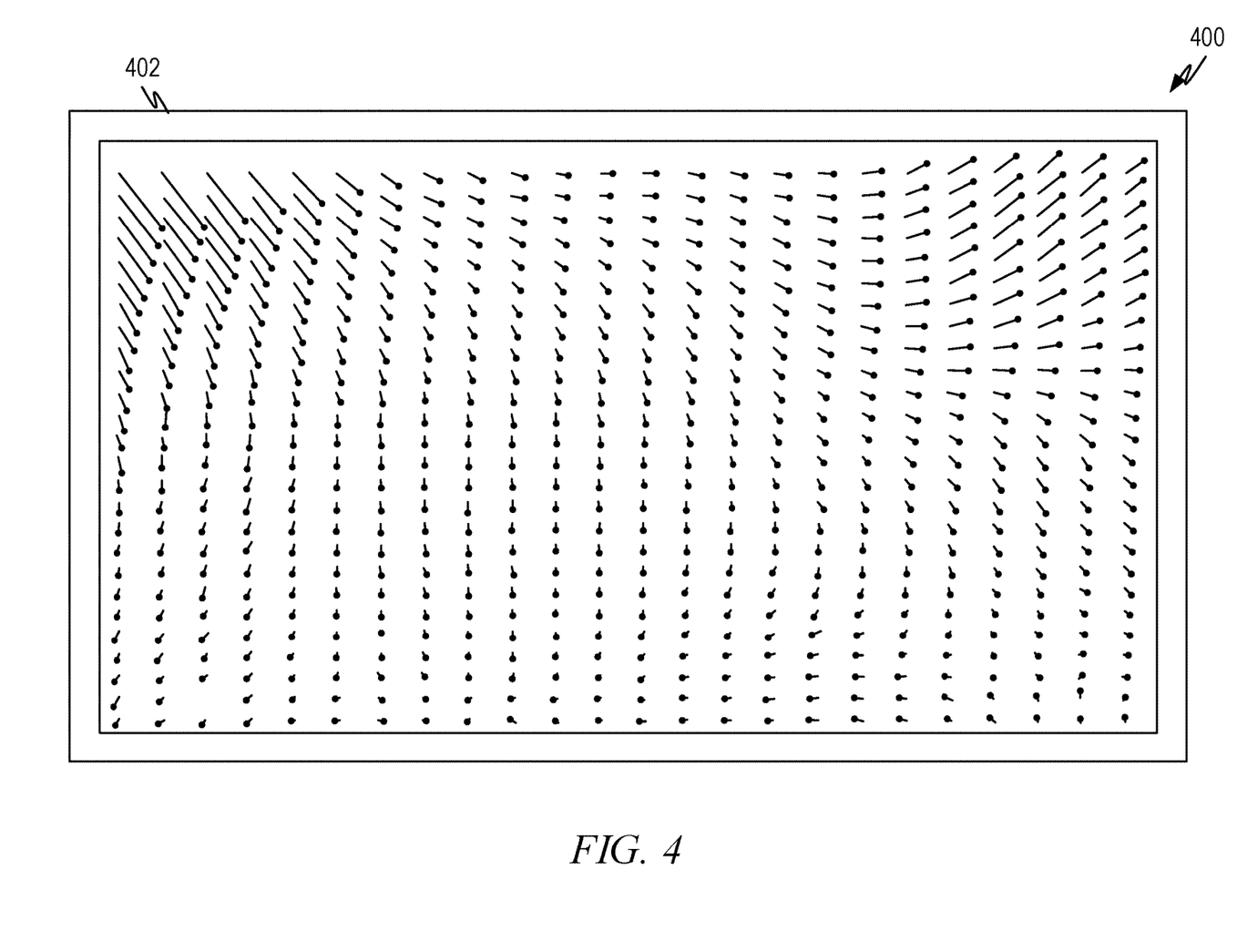
FIG. 4 illustrates a representative screen showing correction factor variation according to some aspects of the present disclosure.

FIG. 4 illustrates a representative screen 402 showing correction factor variation according to some aspects of the present disclosure. The individual lines (error vectors) on the screen show representative direction and error length for an uncorrected screen 402. The beginning of the line (without the dot) shows the reported location that the user is looking at. The end of the line (with the dot) shows the actual location that the user is looking at.

As is evident from the representative diagram 400, each location on the screen can have a different error vector. To correct the user's gaze point (i.e., where the user is looking) so that the reported and actual location, a correction factor proportional to the negative error vector at that point needs to be applied. Furthermore, it is noted that some locations on the screen have little or no need for correction factors. Thus, using only a few representative points for calibration can result in additional errors for eye tracking systems.

Figure 5:
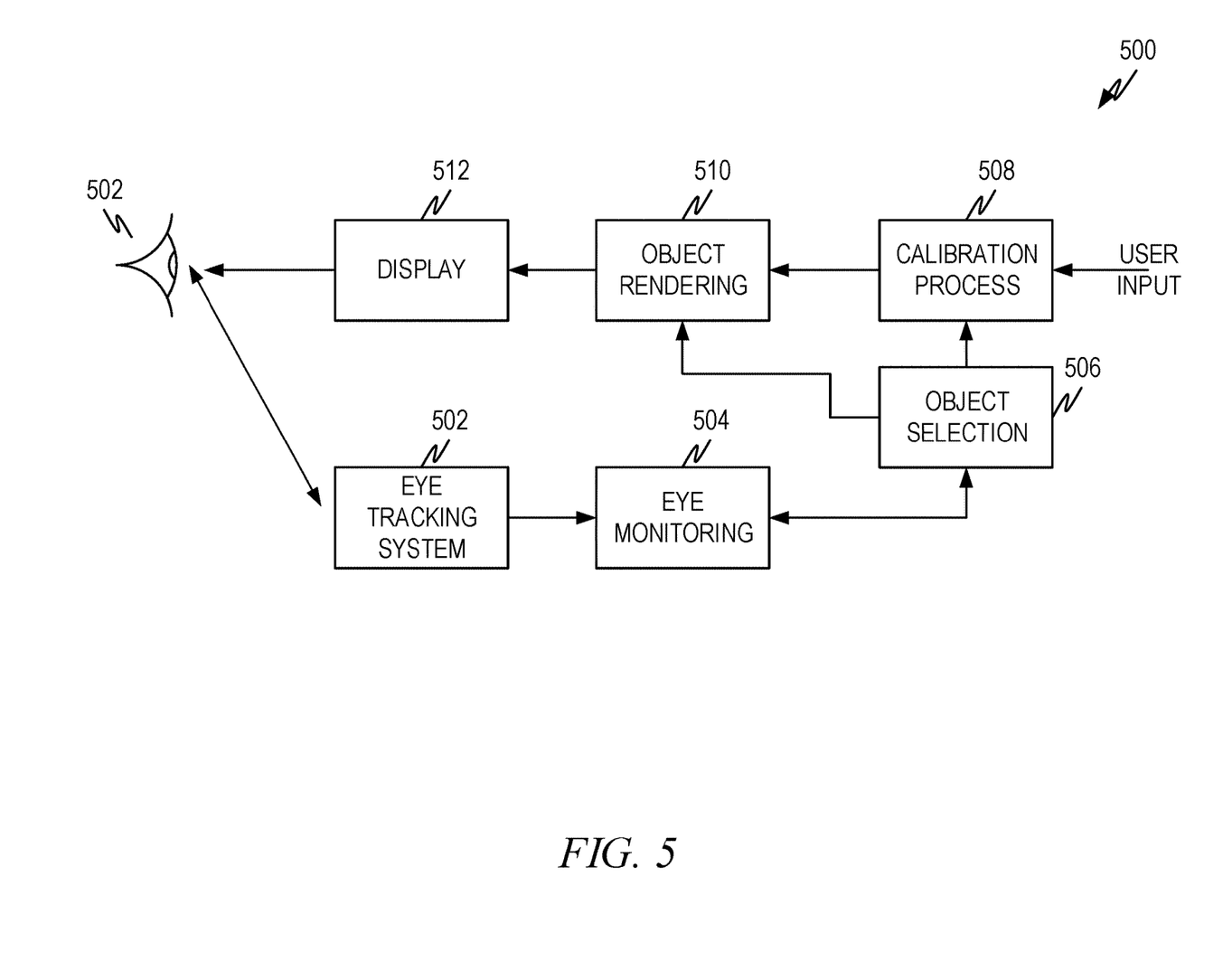
FIG. 5 illustrates an example eye tracking architecture according to some aspects of the present disclosure.

FIG. 5 illustrates an example eye tracking architecture 500 according to some aspects of the present disclosure. The architecture 500 uses an eye tracking subsystem 502 to track the user's gaze as discussed above. The particular eye tracking subsystem 502 that is used is not important as long as the eye tracking system can produce a location and a location vs. time signal (e.g., eye gaze signal) so that the location where the user is looking on the display 510 can be determined.

The eye monitoring process 504 monitors the eye gaze signal and detects various events, such as a reported location where the user is looking and the occurrence of an eye tracking vector that has an origin, a magnitude, and/or direction as discussed herein. There are several options for the eye monitoring process 504. In one embodiment, the eye monitoring process 504 creates an eye tracking location and/or vector and provides the eye tracking location and/or vector to the object selection process 506. In another embodiment, the eye monitoring process 504 receives a vector magnitude and direction from object selection process 506 and allows the object selection process 506 to set up a call back where the eye monitoring process 504 will tell the object selection process 506 if a vector meeting the criteria occurs or if the vector occurs within a designated time period. In another embodiment, the eye monitoring process 504 identifies a location to the object selection process 506 if the user gazes at one location for a designated dwell time. In yet a further embodiment, the eye monitoring process 504 allows the object selection process 506 to set up a callback where the eye monitoring process 504 will tell the object selection process 506 if a location meeting a dwell time occurs or occurs within a designated time period. Other possibilities can also be implemented by eye monitoring process 504.

Object selection process 506 receives eye tracking vectors, locations corresponding to designated dwell times, or call backs notifying the object selection process 506 of the occurrence of either. The object selection process 506 can also provide indications of reported locations, reported vectors, which objects are selected, and so forth to the calibration process 508. The calibration process 508 can track error rates and/or receive user input initiating calibration as described herein. In other embodiments, the object selection process 506 monitors error rates and provides the error rate to the calibration process 508.

Object rendering process 510 implements the desired rendering and/or animation from object selection process 506 and/or calibration process 508 as discussed herein. Display 512 displays the selection targets and other items.

In operation, the display 512 shows one or more selection targets (e.g., items that can be selected by the user). The eye monitoring process 504 receives eye gaze signal from the eye tracking subsystem 502 and ascertains whether a location has met a gaze dwell criteria and/or whether an eye gaze vector meeting a criteria has been identified. Alternatively, the system can output location and/or vector information to the object selection process 506.

The object selection process 506 receives notification that a location and/or vector meets established criteria, such as by a callback from eye monitoring process 504. When the object selection process 506 identifies that location corresponding to a selection target has been selected by the user (e.g., through gaze dwell or some other manner), the object selection process 506 indicates the selection to other systems, processes, and so forth. This may result in identifying additional items that should be rendered by object rendering process 510. Additionally, or alternatively, the object selection process 506 can monitor subsequent user behavior that indicates that an error in selection has been made. For example, if the user cancels a selection that the objection selection process 506 has identified and makes another choice, the object selection process 506 can infer that the initial selection was in error and that the user actually intended the subsequent selection. Error detection can also be performed by the calibration process 508 rather than the object selection process 506 in some embodiments.

The calibration process 508 performs calibration for a reported gaze location based on the error rate and/or based on user input as indicated. Calibration comprises an animation that is implemented by object rendering process 510. A calibration process comprises taking a snapshot of the screen around a reported location and animating the snapshot area to trigger a user response. The calibration process is described in greater detail below.

Figure 6:
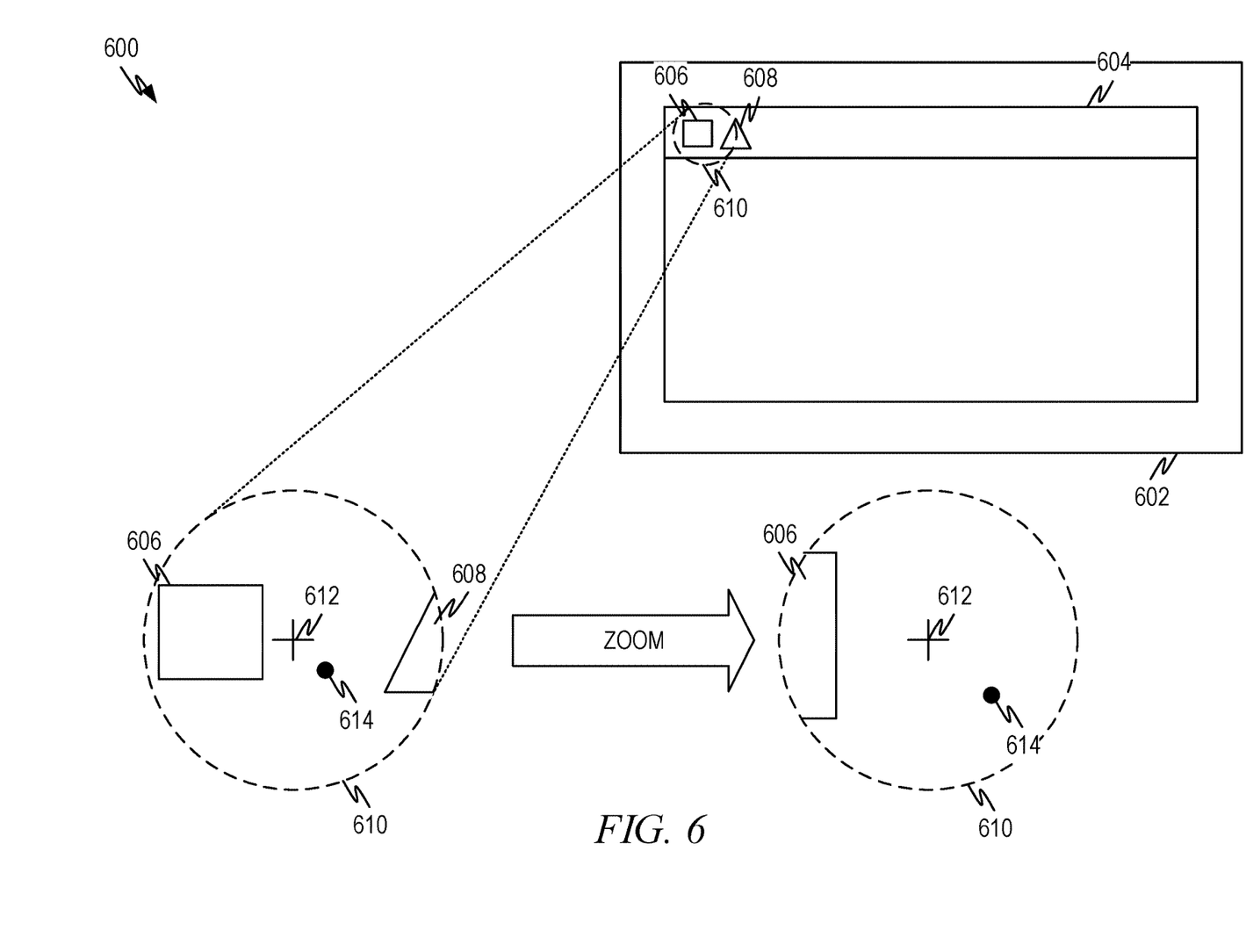
FIG. 6 illustrates a representative calibration animation according to some aspects of the current disclosure.

FIG. 6 illustrates a representative calibration animation 600 according to some aspects of the current disclosure. In this representative example, a screen 602 displays a window 604 having objects 606, 608. The eye tracking subsystem reports a location (i.e., reported location) 612 where the user is looking. When triggered, the calibration process takes a snapshot of an area of the screen around where the user is looking. The snapshot area is represented by 610, and an expanded version of the snapshot area 610 is presented in the lower left of FIG. 1 so that the reported location 612 along with objects and/or portions thereof 606, 608 that are included in snapshot area 610 can be easily seen. In this snapshot area 610, the user's actual location is represented by location 614.

The size of the snapshot area 612 is large enough to include the location where the user is actually looking (i.e., actual location) both before and after animation. The size can be selected based on the location errors of the eye tracking subsystem. Thus, the area is set so that the actual location will fall within the snapshot area after any animation is applied. As a representative example, a circular area 2-3 inches in diameter will be suitable for typical errors in most commercial grade tracking systems. If the screen size will not support such a large snapshot area, the snapshot area can be reduced. This will not likely cause problems since smaller screen sizes tend to be closer to a user's eye and thus an angular error will not translate into a very large size on the screen.

The shape of the snapshot area 612 can be any desired shape. Circular snapshot areas are used in the examples of the disclosure and work well in many circumstances.

Figure 7:
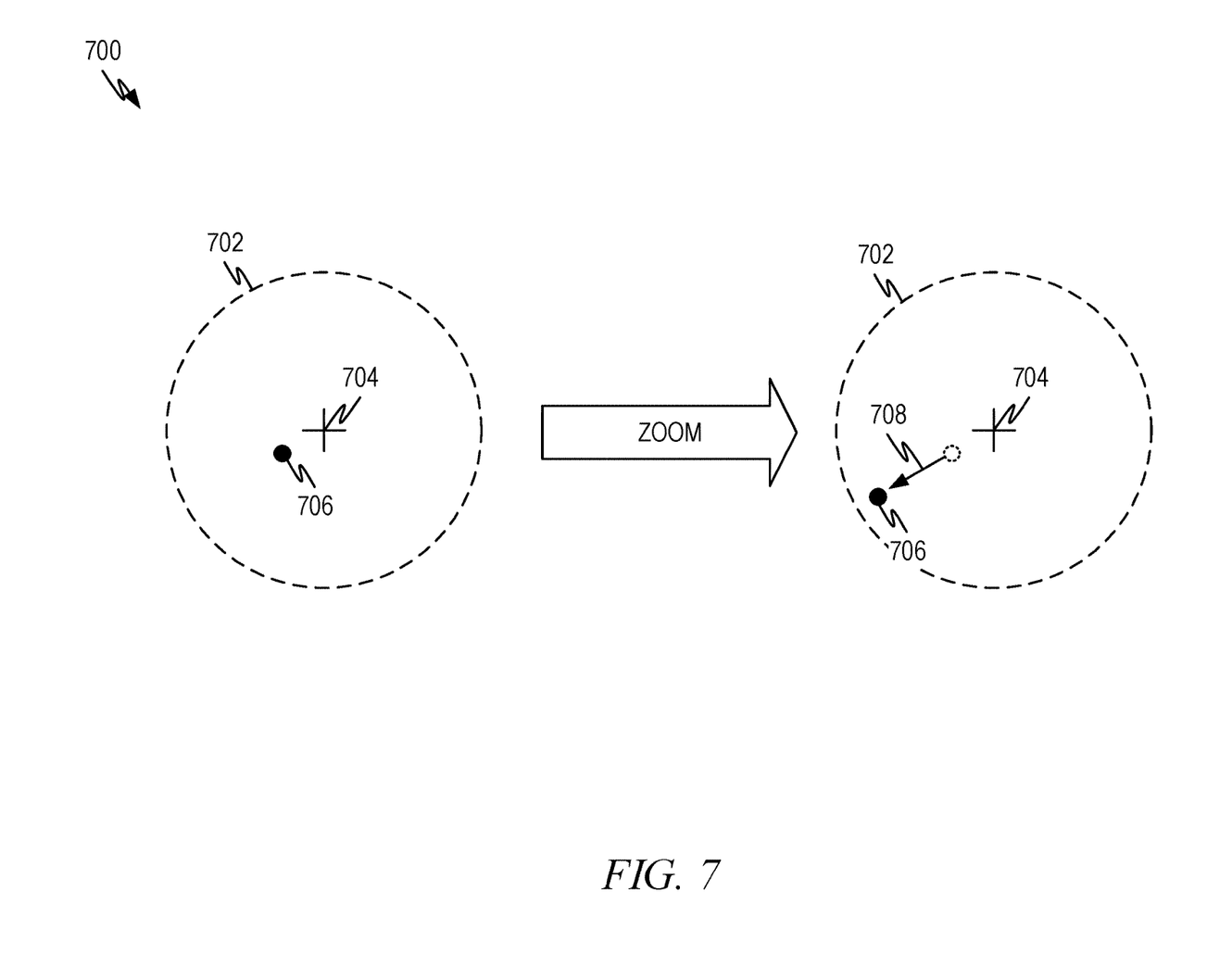
FIG. 7 illustrates a representative calibration animation according to some aspects of the current disclosure.

FIG. 7 illustrates a representative calibration animation 700 according to some aspects of the current disclosure. This illustrates, for example, how the zoom animation illustrated in FIG. 6 produces an eye tracking vector that can be used to calculate a correction factor.

The diagram on the left illustrates a snapshot area 702 prior to any animation being applied. The eye tracking subsystem has a reported location 704 and the snapshot area 702 is selected so that the actual location 706 lies within the snapshot area 702, as described in conjunction with FIG. 6 above. Because of calibration and/or other errors, the reported location 704 will be different than the actual location 706 (i.e., where the user is actually looking on the screen). By animating the snapshot area, the user's gaze will naturally track the actual location 706 and will result in an eye tracking vector with a direction and magnitude.

For example, if a zoom animation is used, the representation of the snapshot area 702 will result in the actual location 706 moving as the area is zoomed as shown on the right. The user's eye will naturally track the actual location as the zoom is applied. The animation thus provides a stimulus that produces eye movement that results in the eye tracking vector 708 as the actual location moves. The eye tracking vector can then be used to calculate the correction factor as described herein.

Figure 8:
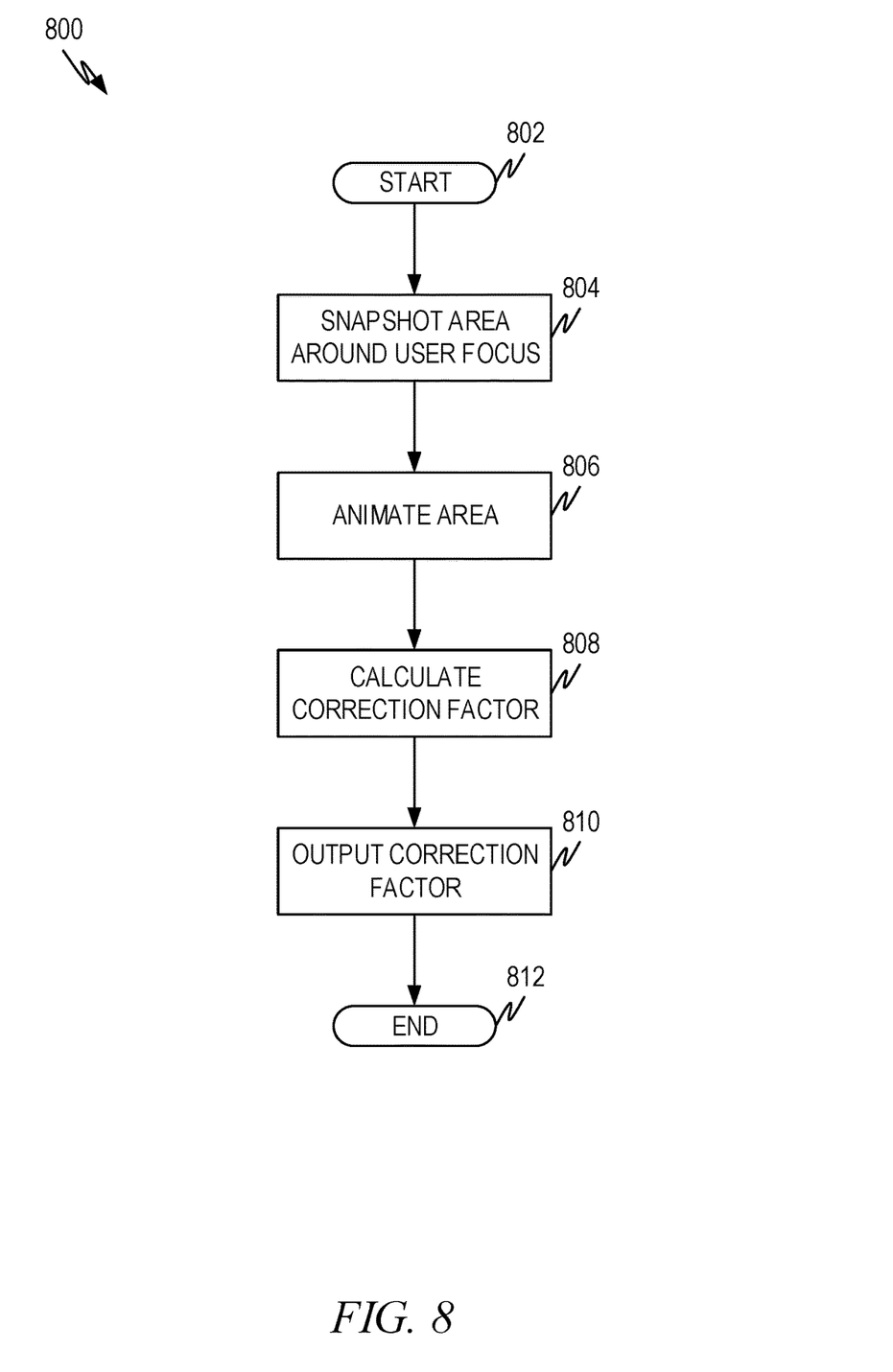
FIG. 8 illustrates a flow diagram showing calibration animation and calculation according to some aspects of the current disclosure.

FIG. 8 illustrates a flow diagram 800 showing calibration animation and calculation according to some aspects of the current disclosure. The method begins at operation 802 and proceeds to operation 804 where a snapshot of the area around the reported location is taken. One of the benefits to the present approach is that it does not matter what is displayed on the screen. There need be no special calibration information displayed on the screen as is used in present calibration procedures. The calibration process can thus occur at any point in the operation of the system and not just as a special mode of operation. The system simply takes a snapshot of whatever is currently being displayed around the reported location and manipulates that snapshot so the underlying display is unaffected. In the alternative, the calibration process can directly manipulate what is displayed within the snapshot area and then return it to its original look (i.e., what was displayed prior to the calibration animation) after the calibration method 800 is complete.

As noted above, the calibration area surrounding the reported location is selected to be large enough to contain the actual location both before and after the animation with a specified degree of likelihood. If the actual location is outside the snapshot area prior to animation, the calibration process will report a zero correction factor. If the actual location is initially within the snapshot area but migrates outside the snapshot area when the animation is applied, the correction factor will be smaller than would otherwise be calculated. Neither of these results is fatal to the method, but they will result in an under corrected display for the reported location.

As previously described, the snapshot area can be any shape. Circular shapes are used in the examples presented herein and tend to work well. However, other shapes can also be used.

Operation 806 animates the area with a selected animation. Animations suitable for the embodiments of this disclosure cause the points within the snapshot area to move along a known/predicted path. For example, a zoom animation causes all the points in the snapshot area to move radially away from the reported location. A lens effect which causes a visual distortion of the snapshot area in a predictable manner can also be used. Lens effects cause the points within the snapshot area to move to new locations along known paths. Other effects can be used as well in accordance with the principles articulated herein. Effects which cause at least some linear (as opposed to rotational) translation are easier to detect and calculate, but rotational translation can also be used.

Operation 808 calculates a correction factor, which can be calculated in a vector format, as an x-offset and y-offset, or in some other coordinate system. For a zoom effect, the following shows how a correction factor can be calculated.

Assume that the actual eye gaze position includes some unknown offset dx (the correction factor we are calculating) from the reported eye gaze position x. A snapshot is taken and the snapshot area is zoomed by a scale factor s around the reported eye gaze position. Assuming that the user's eye gaze follows the same object or feature throughout the animation, the offset at the end of the animation will be sdx. Importantly, this change in offset will be directly observed as a change y in reported eye position during the animation. We can then calculate the value of dx via simple algebra:

$$sdx = dx + y$$
$$dx = \frac{y}{s-1}$$

Note that x, dx, and y are vector (2D) quantities. In some embodiments, the correction factor can be reduced for correction factors falling below a threshold (e.g., small correction factors). This can help reduce the influence of noise on the correction factor in some instances.

Similar calculations can be performed for other animations.

Operation 810 outputs the correction factor and the system can store the correction factor for the reported location. The method ends at operation 812.

The correction factor calculations can be performed for any locations on the screen and can be triggered automatically or manually as described herein.

Figure 9:
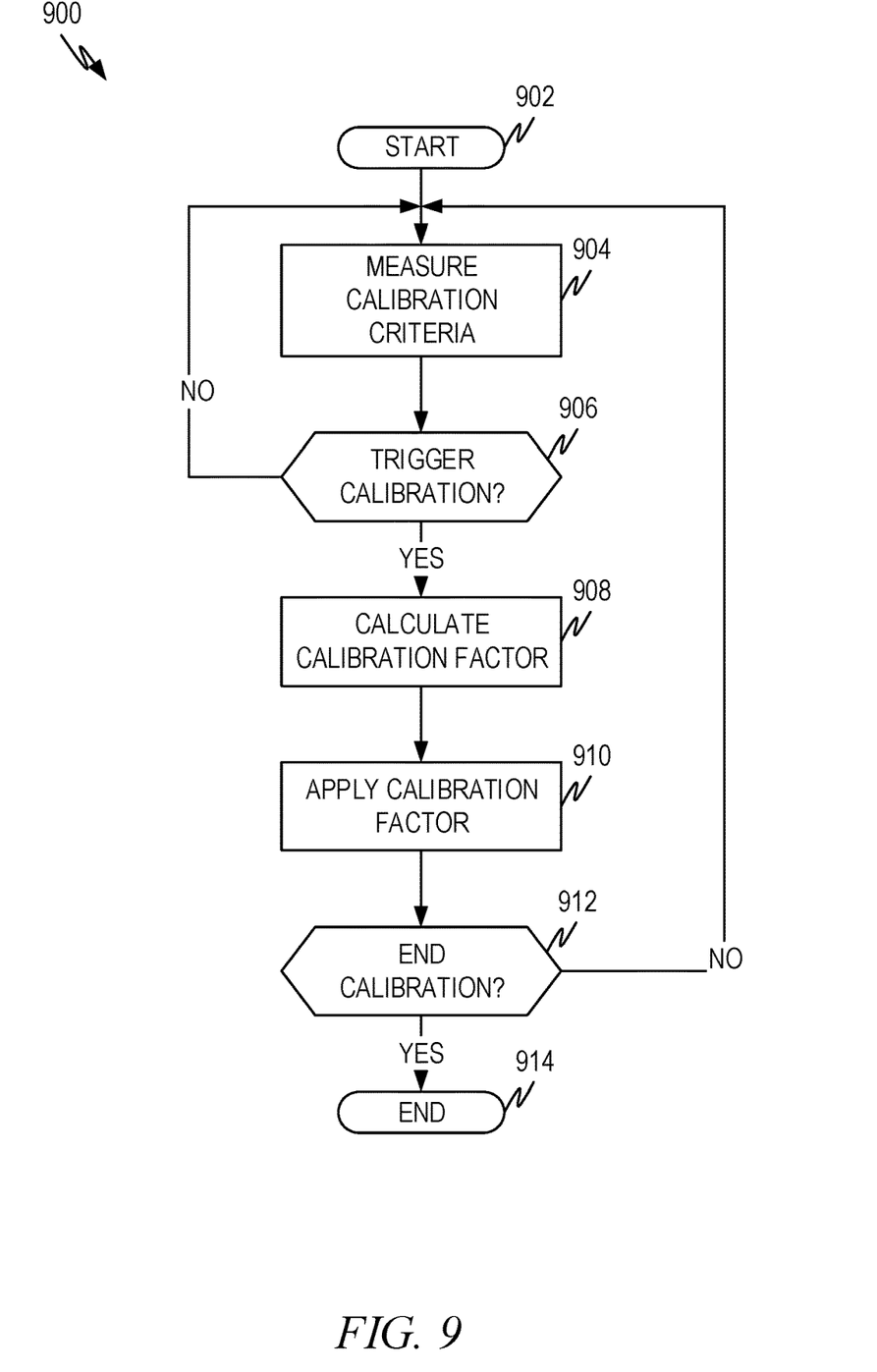
FIG. 9 illustrates a flow diagram for automatic correction factor calculation according to some aspects of the current disclosure.

FIG. 9 illustrates a flow diagram 900 for automatic correction factor calculation according to some aspects of the current disclosure. This diagram shows how a map of correction factors (such as those shown in FIG. 4) can be created and/or modified over time.

The method starts at operation 902 and proceeds to operation 904. Operation 904 monitors the error rate or other calibration criteria to identify the occurrence of an event that should trigger calibration. Because the calibration procedure identified herein is very quick and can quickly and easily be run for any given reported location, it is possible to monitor error rates for a reported location (or region of reported locations) to see when a particular location should be calibrated to reduce errors.

For example, user selection errors for a location or region of locations can be monitored and when the error rate exceeds a threshold, the system can perform calibration for the current reported location. User selection errors can be identified by patterns detected in user selections. For example, the system believes on item to be selected but the system cancels the selection and makes another selection instead. Another indicator can include the user undoing the effects of a selected function immediately after it is applied. Yet another is prior to execution of a function associated with a selected item, having the user dismiss the selected item so that the associated function is never executed. These are representative examples and other indicators can also be used.

One or more of the above indicators can be identified for a particular area of the screen and when the number of errors exceed a threshold, the calibration process can be triggered for a location in the area. Additionally, or alternatively, the number of errors in a given period of time for an area of the screen can be compared to a threshold and when the errors per time exceed the threshold, the calibration process can be triggered for a location in the area. Other error measures can also be used to trigger the calibration in other embodiments. A user can also manually trigger the calibration process in some embodiments.

One of the principles that should be apparent from this explanation is that the error rates, and so forth can be monitored on an area and/or location basis, so that a calibration triggered in an area or location does not necessarily trigger a calibration in another. Additionally, or alternatively, a global error rate can be monitored and when the error rate exceeds a threshold, calibration at several locations can be triggered. Similarly, manual triggering can be for a location, an area, or multiple locations spread out over a region or the entire display, depending on the embodiment.

Operation 906 identifies if a calibration process should be triggered, such as by one of the above error measures exceeding a threshold, through a manual trigger or other criteria. If the calibration process should be triggered, execution proceeds to operation 908. Otherwise, execution returns to operation 904 where the error measures, the manual triggers, and so forth are monitored.

Operation 908 calculates the correction factor, such as by the process discussed in conjunction with FIG. 8. Once the correction factor is calculated, operation 910 applies the correction factor. Although a correction factor is calculated for a particular reported location, locations in an area around the reported location will have similar correction factors, so the correction factor can be applied to multiple locations in some embodiments. In other embodiments, other stored correction factors can be used to interpolate correction factors between stored correction factors based on trends in the correction factors across the display.

Operation 912 identifies whether the correction factor process should be terminated. The correction factor process of FIG. 9 can be constantly running in the background while the user uses the system. Thus, in some embodiments, the "no" branch is taken until some triggering event shuts down the process. In other embodiments, the "yes" branch is taken unless some event keeps the process alive.

The method ends at operation 914.

Example Machine Architecture and Machine-Readable Medium

Figure 10:
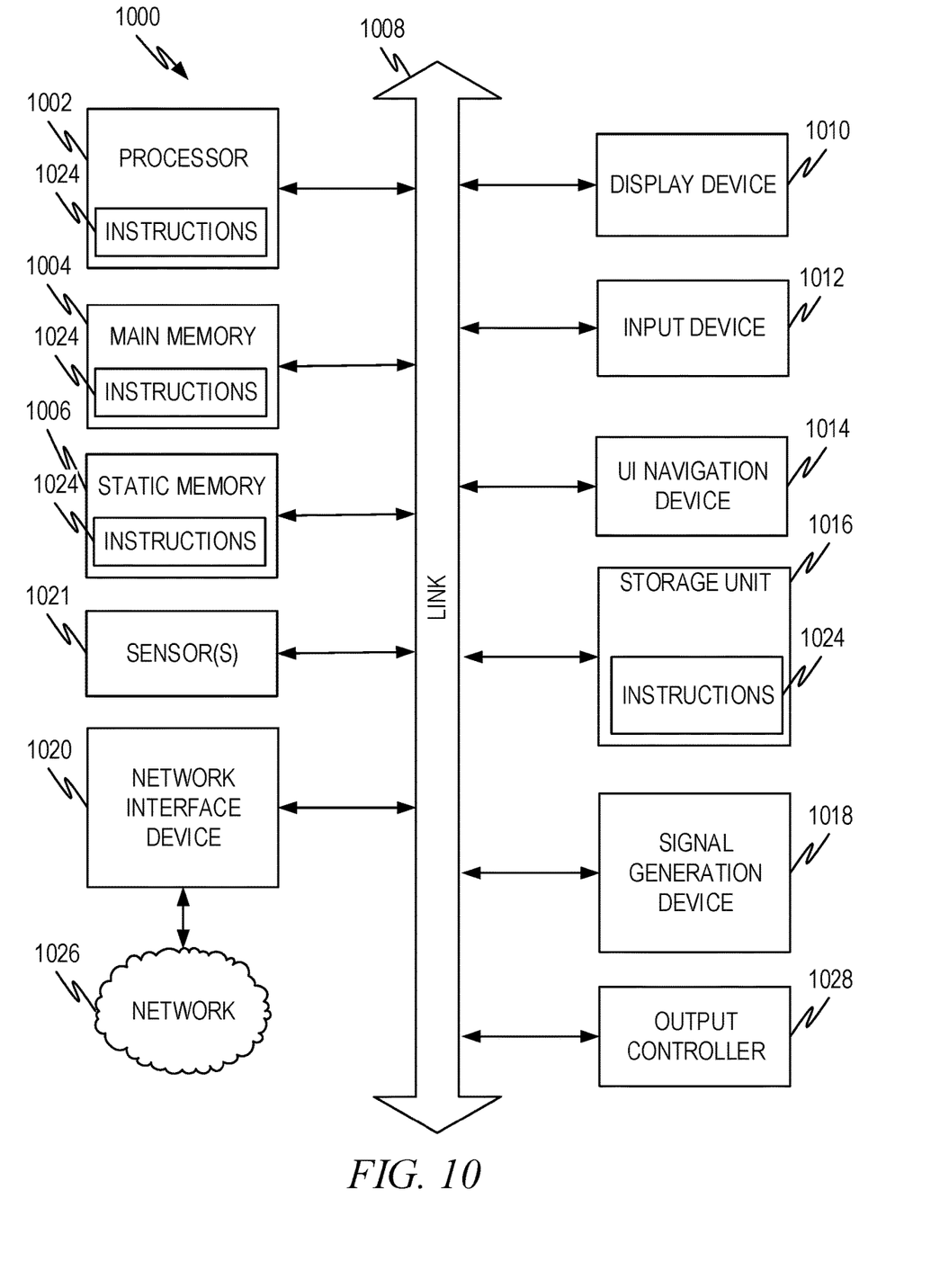
FIG. 10 illustrates a representative machine architecture suitable for implementing the systems and other aspects disclosed herein or for executing the methods disclosed herein.

FIG. 10 illustrates a representative machine architecture suitable for implementing the systems and other aspects disclosed herein or for executing the methods disclosed herein. The machine of FIG. 10 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 10 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 1000 includes at least one processor 1002 (e.g., a central processing unit (CPU), a graphics processing unit (GPU), advanced processing unit (APU), or combinations thereof), one or more memories such as a main memory 1004, a static memory 1006, or other types of memory, which communicate with each other via link 1008. Link 1008 may be a bus or other type of connection channel. The machine 1000 may include further optional aspects such as a graphics display unit 1010 comprising any type of display. The machine 1000 may also include other optional aspects such as an alphanumeric input device 1012 (e.g., a keyboard, touch screen, and so forth), a user interface (UI) navigation device 1014 (e.g., a mouse, trackball, touch device, and so forth), a storage unit 1016 (e.g., disk drive or other storage device(s)), a signal generation device 1018 (e.g., a speaker), sensor(s) 1021 (e.g., global positioning sensor, accelerometer(s), microphone(s), camera(s), an eye tracking subsystem, and so forth), output controller 1028 (e.g., wired or wireless connection to connect and/or communicate with one or more other devices such as a universal serial bus (USB), near field communication (NFC), infrared (IR), serial/parallel bus, etc.), and a network interface device 1020 (e.g., wired and/or wireless) to connect to and/or communicate over one or more networks 1026.

Executable Instructions and Machine-Storage Medium

The various memories (i.e., 1004, 1006, and/or memory of the processor(s) 1002 and/or storage unit 1016 may store one or more sets of instructions and data structures (e.g., software) 1024 embodying or utilized by any one or more of the methodologies or functions described herein. These instructions, when executed by processor(s) 1002 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1

A computer implemented method for eye gaze correction, comprising:
identifying a reported location from an eye tracking signal;
taking a snapshot of screen content in a region surrounding the reported location such that the reported location is at a center of the region;
animating the snapshot with an animation such that locations within the snapshot move in a predetermined path from the center of the region;
receiving a pursuit vector responsive to the animation;
calculating a correction factor from the pursuit vector; and
applying the correction factor at the reported location to adjust the reported location to an actual location.

Example 2

The method of example 1 wherein the animation comprises zooming.

Example 3

The method of example 1 wherein the animation comprises a lens effect.

Example 4

The method of example 1 wherein the animation comprises moving points in the snapshot area away from the center point.

Example 5

The method of example 1, 2, 3 or 4 further comprising:
monitoring an error rate of user selection of screen items at a plurality of locations on a display screen;
comparing the error rate to a threshold;
responsive to the error rate exceeding the threshold, initiating the method operations of example 1.

Example 6

The method of example 5 responsive to the error rate not exceeding the threshold, refraining from initiating the method operations of example 1.

Example 7

The method of example 1 wherein the correction factor is reduced when the correction factor falls below a threshold.

Example 8

The method of example 1 wherein the correction factor comprises an x offset and a y offset.

Example 9

The method of example 1 wherein the method further comprises:

receiving an input from a user that triggers the method operations of example 1.

Example 10

A system comprising a processor and computer executable instructions, that when executed by the processor, cause the system to perform acts comprising:
identify a reported location from an eye tracking signal;
take a snapshot of screen content in a region surrounding the reported location such that the reported location is at a center of the region;
animate the snapshot with an animation such that locations within the snapshot move in a predetermined path from the center of the region;
receive a pursuit vector responsive to the animation;
calculate a correction factor from the pursuit vector; and
apply the correction factor at the reported location to adjust the reported location to an actual location.

Example 11

The system of example 10 wherein the animation comprises zooming.

Example 12

The system of example 10 wherein the animation comprises a lens effect.

Example 13

The system of example 10 wherein the animation comprises moving points in the snapshot area away from the center point.

Example 14

The system of example 10, 11, 12, or 13 further comprising:
monitoring an error rate of user selection of screen items at a plurality of locations on a display screen;
comparing the error rate to a threshold;
responsive to the error rate exceeding the threshold, initiating the acts of example 10.

Example 15

The system of example 14 responsive to the error rate not exceeding the threshold, refraining from initiating the acts of example 10.

Example 16

A computer implemented method for eye gaze correction, comprising:
identifying a reported location from an eye tracking signal (612, 704, 804);
taking a snapshot of screen content in a region surrounding the reported location such that the reported location is at a center of the region (610, 702, 804);
animating the snapshot with an animation such that locations within the snapshot move in a predetermined path from the center of the region (806);
receiving a pursuit vector responsive to the animation (706, 808);
calculating a correction factor from the pursuit vector (808); and
applying the correction factor at the reported location to adjust the reported location to an actual location (910).

Example 17

The method of example 16 wherein the animation comprises zooming.

Example 18

The method of example 16 or 17 wherein the animation comprises a lens effect.

Example 19

The method of example 16, 17 or 18 wherein the animation comprises moving points in the snapshot area away from the center point.

Example 20

The method of example 16, 17, 18, or 19 further comprising:
monitoring an error rate of user selection of screen items at a plurality of locations on a display screen;
comparing the error rate to a threshold;
responsive to the error rate exceeding the threshold, initiating the method operations of example 16.

Example 21

The method of example 20 responsive to the error rate not exceeding the threshold, refraining from initiating the method operations of example 16.

Example 22

The method of example 20 wherein the error rate comprises a number of object selection errors.

Example 23

The method of example 20 wherein the error rate comprises a number of errors in a given period of time.

Example 24

The method of example 20 wherein the error rate comprises detecting patterns in user selection.

Example 25

The method of example 20 wherein the error rate comprises a number of errors in selecting a particular object.

Example 26

The method of example 16, 17, 18, 19, 20, 21, 22, 23, 24, or 25 wherein the correction factor is reduced when the correction factor falls below a threshold.

Example 27

The method of example 16, 17, 18, 19, 20, 21, 22, 23, 24, 25, or 26 wherein the correction factor comprises an x offset and a y offset.

Example 28

The method of example 16, 17, 18, or 19 wherein the method further comprises receiving an input from a user that triggers the method operations of example 16.

Example 29

An apparatus comprising means to perform a method as in any preceding example.

Example 30

Machine-readable storage including machine-readable instructions, when executed, to implement a method or realize an apparatus as in any preceding example.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A computer implemented method for eye gaze correction, comprising:
   identifying a reported location from an eye tracking signal;
   animating information displayed within a region centered on the reported location with an animation without displaying a separate calibration screen, the animation comprising moving locations within the region in a predetermined path from the center of the region;
   receiving a pursuit vector responsive to the animation;
   calculating a correction factor from the pursuit vector; and
   applying the correction factor at the reported location to adjust the reported location to an actual location.

2. The method of claim 1 wherein the animation comprises zooming.

3. The method of claim 1 wherein the animation comprises a lens effect.

4. The method of claim 1 wherein the animation comprises moving points in the region away from the center point.

5. The method of claim 1 further comprising:
   monitoring an error rate of user selection of screen items at a plurality of locations on a display screen;
   comparing the error rate to a threshold;
   responsive to the error rate exceeding the threshold, initiating the method operations of claim 1.

6. The method of claim 1 wherein the correction factor is reduced when the correction factor falls below a threshold.

7. The method of claim 1 wherein the correction factor comprises an x offset and a y offset.

8. The method of claim 1 wherein the method further comprises:
   receiving an input from a user that triggers the method operations of claim 1.

9. The method of claim 1 wherein animating information displayed within the region comprises:
   taking a snapshot of the region and displaying the snapshot in place so that information within the snapshot is not moved from its original location; and
   wherein the animation is a zoom animation.

10. A system comprising a processor and computer executable instructions, that when executed by the processor, cause the system to perform acts comprising:
    identify a reported location from an eye tracking signal;
    take a snapshot of screen content in a region surrounding the reported location such that snapshot remains in its original location on the screen with the reported location within the region;
    animate the snapshot with an animation such that locations within the snapshot move in a predetermined path from the reported location;
    receive a pursuit vector responsive to the animation;
    calculate a correction factor from the pursuit vector; and
    apply the correction factor at the reported location to adjust the reported location to an actual location.

11. The system of claim 10 wherein the animation comprises zooming.

12. The system of claim 10 wherein the animation comprises a lens effect.

13. The system of claim 10 wherein the animation comprises moving points in the snapshot away from the center point.

14. The system of claim 10 further comprising:
    monitoring an error rate of user selection of screen items at a plurality of locations on a display screen;
    comparing the error rate to a threshold;
    responsive to the error rate exceeding the threshold, initiating the acts of claim 10.

15. The system of claim 14 responsive to the error rate not exceeding the threshold, refraining from initiating the acts of claim 10.

16. The system of claim 10 wherein the correction factor is reduced when the correction factor falls below a threshold.

17. The system of claim 10 wherein the correction factor comprises an x offset and a y offset.

18. The system of claim 10 wherein the acts further comprise:
    receiving an input from a user that triggers the acts of claim 10.

19. A computer storage medium comprising executable instructions that, when executed by a processor of a machine, cause the machine to perform acts comprising:
    determine whether an error rate exceeds a threshold;
    responsive to the error rate exceeding the threshold, performing acts comprising:
      identify a reported location from an eye tracking signal;
      take a snapshot of screen content in a region surrounding the reported location such that snapshot remains in its original location on the screen with the reported location at a center of the region;
      animate the snapshot with an animation such that locations within the snapshot move in a predetermined path from the center of the region;
      receive a pursuit vector responsive to the animation;
      calculate a correction factor from the pursuit vector; and
      apply the correction factor at the reported location to adjust the reported location to an actual location.

20. The medium of claim 19 wherein the animation comprises a zoom effect.

* * * * *